United States Patent [19]

Ury

[11] 4,080,004
[45] Mar. 21, 1978

[54] SERVICE AND EMERGENCY TRAILER VALVE

[75] Inventor: John M. Ury, Hazelwood, Mo.

[73] Assignee: Wagner Electric Corporation, Parsippany, N.J.

[21] Appl. No.: 794,301

[22] Filed: May 5, 1977

Related U.S. Application Data

[63] Continuation of Ser. No. 677,405, Apr. 15, 1976, Pat. No. 4,042,281.

[51] Int. Cl.² ............................................. B60T 15/02
[52] U.S. Cl. ......................................... 303/9; 303/29; 303/40
[58] Field of Search ..................... 303/7, 9, 13, 28, 29, 303/30, 40, 68–71, 83

[56] References Cited

U.S. PATENT DOCUMENTS

| | | | |
|---|---|---|---|
| 3,097,021 | 7/1963 | Dobrikin | 303/29 |
| 3,273,582 | 9/1966 | Valentine | 303/83 X |
| 3,411,836 | 11/1968 | Dobrikin et al. | 303/40 |
| 3,456,991 | 7/1969 | Valentine et al. | 303/29 |
| 3,862,782 | 1/1975 | Horowitz et al. | 303/40 |
| 3,863,992 | 2/1975 | Kurke et al. | 303/9 |
| 3,947,072 | 3/1976 | Plantan | 303/13 |
| 3,953,079 | 4/1976 | Sebo et al. | 303/7 |
| 4,017,125 | 4/1977 | Durling | 303/7 |

*Primary Examiner*—Duane A. Reger
*Attorney, Agent, or Firm*—Eyre, Mann, Lucas & Just

[57] ABSTRACT

A valve for use in applying brake releasing pressure to brake chambers in a vehicle air brake system having reservoirs each containing air for either service or emergency use and having air pressure supply lines. The valve includes a housing. A chamber is formed in the housing. A port permits air communication between the valve and a supply line. A passage interconnects the port and the chamber. Reservoir ports interconnect through the passage. A first plurality of one-way check valves in the passage permit air to pass therethrough from the port to the reservoir ports. A second plurality of one-way check valves in the passage permit air to pass therethrough from the reservoir ports to the chamber.

13 Claims, 5 Drawing Figures

SERVICE AND EMERGENCY TRAILER VALVE

CROSS-REFERENCE TO RELATED APPLICATIONS

The present application is a continuation of application Ser. No. 677,405 filed Apr. 15, 1976, now U.S. Pat. No. 4,042,281 issued Aug. 16, 1977.

The valve of this invention is for use with a vehicle brake system of the type having reservoirs each containing air for either service or emergency use such as the system described in U.S. Pat. No. 3,992,064 titled "Vehicle Brake System" issued Nov. 16, 1976 to Michael L. Carton et al and assigned to the assignee of this invention.

BACKGROUND OF THE INVENTION

1. Field of the Invention

This invention relates generally to fluid-pressure brake and analogous systems and more particularly to automatic application valves for use therewith.

2. Description of the Prior Art

Presently, air brake systems for towed vehicles generally comprise three arrangements. First, there is the type of system utilizing a single service reservoir for providing a source of pressurized air to all the service brake chambers and a single emergency or parking reservoir for supplying pressurized air to all the parking brake chambers. Second, there is the type of system utilizing more than one service reservoir each providing a source of air for operating some of the service brake chambers and a single parking reservoir for supplying pressurized air to all the parking brake chambers. Third, there is the type of system utilizing plural service reservoir capability to provide at least partial service braking in the event of failure in one of the service systems and also having plural parking reservoir capability, so that, in the event of failure in one or more of the parking reservoirs, there will still be air pressure retained in the parking brake chambers to prevent the undesirable automatic application of the parking brakes.

The third system, described above, includes an air receiving portion, a valve portion, an air storage portion and a brake portion. The valve portion includes a multiplicity of valves interconnected with costly external "plumbing" for cooperative functioning with the other portions of the system. It would therefore be of benefit to have, in conjunction with a service and parking brake system offering more than single service reservoir capability to provide at least partial service braking in the event of failure in one of the service systems and also offering more than single parking reservoir capability so that, in the event of failure in one of the parking reservoirs, there would still be air pressure communication with the parking brake chamber to prevent the undesirable automatic application of the parking brakes, a valve for use in applying brake releasing pressure to the brake chambers which valve includes multiple cooperative functions thus eliminating the need for the costly external plumbing and the multiplicity of various valves generally associated with such systems.

SUMMARY OF THE INVENTION

Accordingly, the present invention includes a valve for use in applying brake releasing pressure to brake chambers in a vehicle air brake system having reservoirs each containing air for either service or emergency use and having air pressure supply lines. The foregoing is accomplished by providing a valve including a housing having a chamber formed therein. A port permits air communication between the valve and a supply line. A passage interconnects the port and the chamber. Reservoir ports interconnect through the housing by a passage. A first plurality of one-way check valves in the passage permits air to pass therethrough from the port to the reservoir ports. A second plurality of one-way check valves in the passage permits air to pass therethrough from the reservoir ports to the chamber. Another passage is provided in the housing for interconnecting the port and the chamber so as to bypass the first named passage. Another one-way check valve is in the second named passage for permitting fluid to pass therethrough from the port to the chamber. Also, a pressure regulating valve is in the first named passage for permitting fluid above a predetermined pressure to pass therethrough.

Other advantages and novel features of this invention will become apparent from the following detailed description of the invention when considered in conjunction with the accompanying drawings.

BRIEF DESCRIPTION OF THE DRAWINGS

In the drawings wherein like parts are marked alike.

DESCRIPTION OF THE PREFERRED EMBODIMENT

Figure 1:
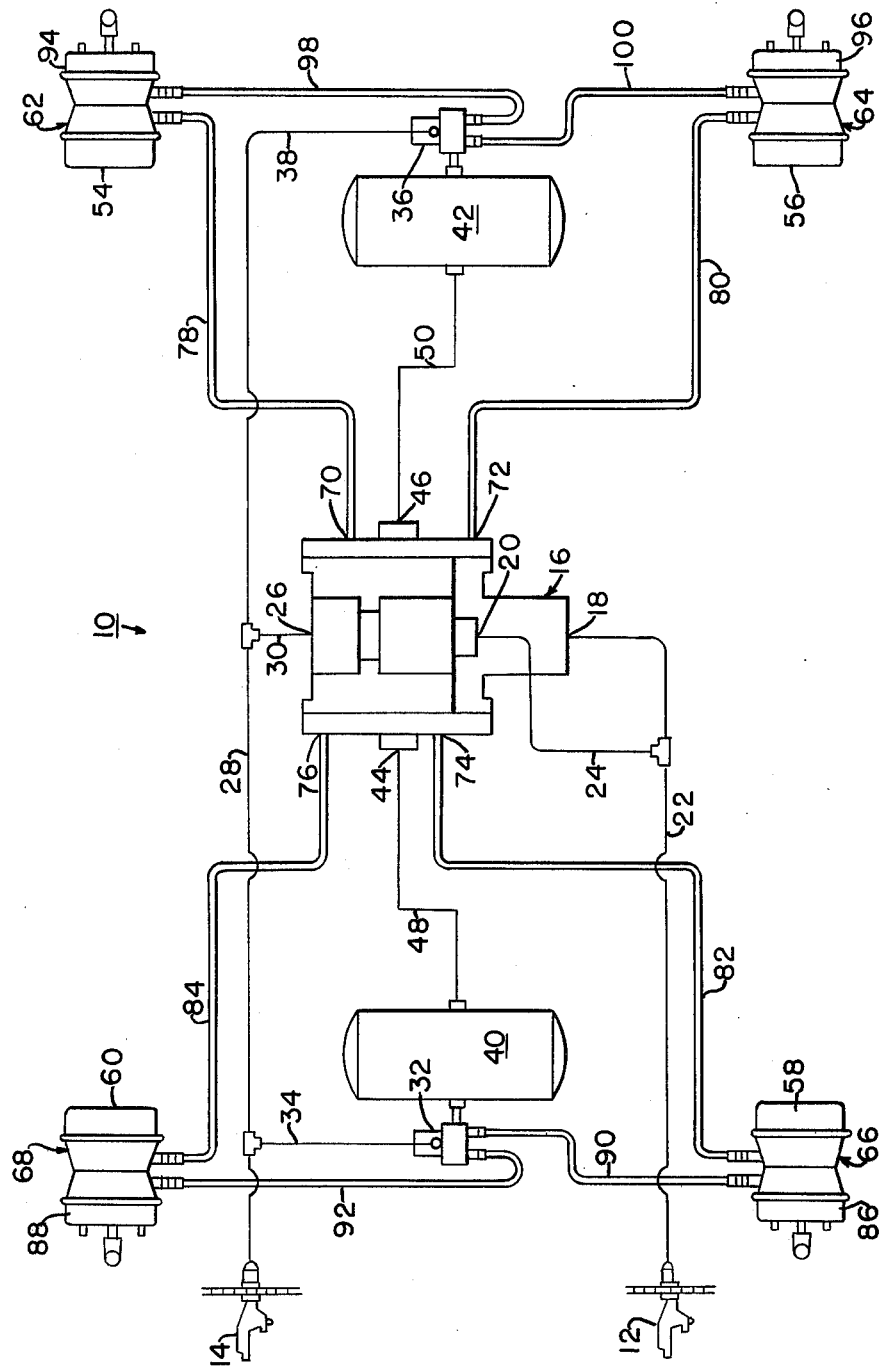
FIG. 1 graphically illustrates a vehicle brake system including the valve of this invention.

Referring now to the drawings and specifically FIG. 1, a vehicle brake system is generally designated 10 and includes gladhand connectors 12, 14 for receiving air from a supply source such as a tractor (not shown) of a well known tractor-trailer combination. First connector 12 can be connected for receiving supply or emergency air and second connector 14 can be connected for receiving control or service air. Typically, the supply air is the air which passes through the system and is eventually communicated to brake chambers whereas the control air is the air used for operating on brake operating valves. However, supply air is sometimes used for operating on brake operating valves as well as being communicated to the brake chambers.

Supply air received at gladhand connector 12 is communicated to valve 16 at ports 18, 20 thereof via conduits 22, 24. Control air received at gladhand connector 14 is communicated to valve 16 at port 26 via conduits 28, 30, to valve 32 via conduits 28, 34 and to valve 36 via conduits 28, 38. Some of the supply air received at port 18 of valve 16 is eventually communicated through valve 16 to either of the service or emergency reservoirs 40, 42 via reservoir ports 44, 46 and conduits 48, 50, respectively. Other of the supply air received at port 18 is eventually communicated to parking brake chambers 54, 56, 58, 60 of main brake chambers 62, 64, 66, 68 via brake chamber ports 70, 72, 74, 76 and conduits 78, 80, 82, 84, respectively. Air in reservoir 40 is communicated through skid control type valve 32 to service brake chambers 86, 88 of main brake chambers 66, 68, via conduits 90, 92, respectively, and air in reservoir 42 is communicated through skid control type valve 36 to service brake chambers 94, 96 of main brake chambers 62, 64 via conduits 98, 100, respectively. Air in either reservoir 40 or 42 is also available to parking brake chambers 54, 56, 58, 60 by returning to valve 16 via conduits 48, 50 and ports 44, 46 respectively and then eventually through ports 70, 72, 74, 76 of valve 16 to the parking brake chambers 54, 56, 58, 60 via conduits 78, 80, 82, 84, respectively.

Figure 2:
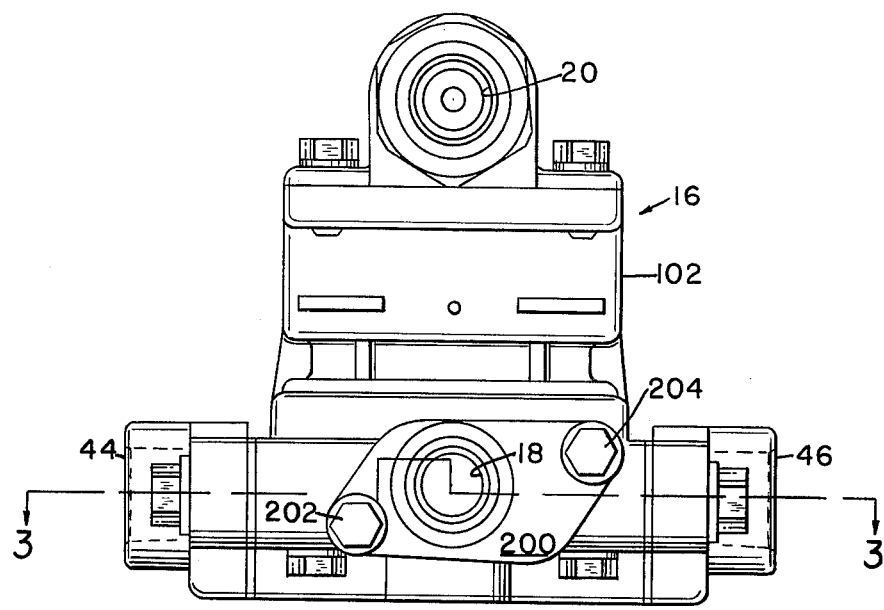
FIG. 2 illustrates a side elevation of the valve of this invention.

In FIG. 2, valve 16 is shown including housing 102 preferably cast of a suitable metal. Also ports 18 and 20 are shown for receiving air from supply gladhand 12 via conduits 22, 24, respectively. In addition, reservoir ports 44, 46 are shown for delivering air to and receiving air from reservoirs 40, 42 via conduits 48, 50, respectively.

Figure 3:
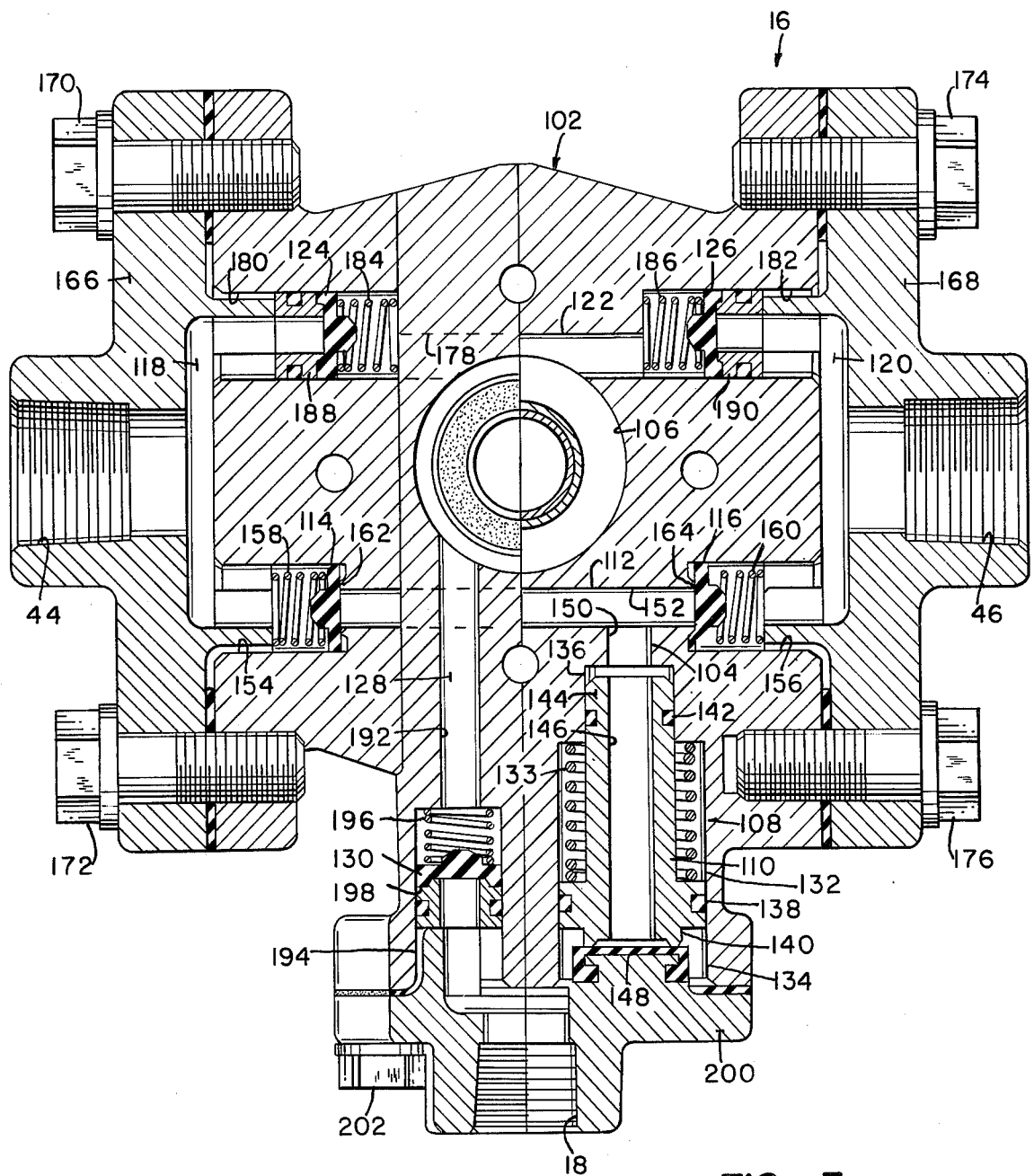
FIG. 3 illustrates a cross-sectional view of a portion of the valve taken along line 3—3 of FIG. 2.

In FIG. 3, valve 16 includes port 18 provided in housing 102. A main passage 104 interconnects port 18 and chamber 106. The main passage 104 includes a branch passage or portion 108 for accommodating well-known pressure regulating valve 110. Branch passage 108 intersects branch passage 112 which accommodates well-known unidirectional or one-way check valves 114, 116 therein. Branch passage 112 intersects branch passages 118, 120 at opposite ends thereof. Reservoir ports 44, 46 intersect branch passages 118, 120 respectively. Branch passage 122 interconnects branch passages 118, 120 at opposite ends thereof and is provided to accommodate well-known unidirectional or one-way check valves 124, 126 therein. Also passage 122 intersects chamber 106. Another passage 128 interconnects port 18 and chamber 106. Passage 128 is provided to accommodate well-known one-way check valve 130 therein.

More particularly now, in FIG. 3, branch passage 108 of main passage 104 interconnects port 18 and branch passage 112. Passage 108 is provided with enlarged annular portion 132 having a first end 134 and a second end 136. Pressure regulating valve 110 is resiliently mounted in portion 132 by spring 133 and is sealingly slidably engaged therein by "O" ring 138 adjacent valve first end 140 and "O" ring 142 adjacent valve second end 144. Passage 146 is formed through valve 110 to permit the passage of fluid therethrough from first end 140 to second end 144. First end 140 sealingly seats against a suitable resilient seal 148 at first end 134 of portion 132. Smaller annular portion 150 of passage 108 interconnects portion 132 and passage 112. Branch passage 112 includes smaller portion 152 and relatively larger annular portions 154, 156 at opposite ends thereof for accommodating one-way check valves 114, 116, respectively. The check valves are preferably of a resilient material and resiliently mounted in their respective portions 154, 156 by springs 158, 160 for sealingly seating against their respective seats 162, 164. Branch passages 118, 120 interconnect passages 112 and 122 and may, if preferred, be formed when caps 166, 168 are bolted on housing 102 by bolts 170, 172, 174, 176 as shown. Reservoir ports 44, 46 are provided in caps 166, 168, respectively so as to intersect branch passages 118, 120. Branch passage 122 interconnects passages 118, 120 and includes smaller portion 178 and relatively larger portions 180, 182 at opposite ends thereof for accommodating one-way check valves 124, 126, respectively. The check valves are similar to check valves 114, 116 and are preferably of a resilient material and resiliently mounted in their respective portions 180, 182 by springs 184, 186 for sealingly seating against their respective seats 188, 190. Smaller portion 178 intersects chamber 106. Passage 128 interconnects port 18 and chamber 106 and includes smaller portion 192 and relatively larger portion 194 for accommodating resilient one-way check valve 130, similar to check valves 124, 126 and resiliently mounted in portion 194 by spring 196 for sealingly seating against seat 198. If preferred, port 18 may be provided in cap 200 which may be bolted to housing 102 by bolts 202, 204 as shown in FIGS. 2 and 3.

Figure 4:
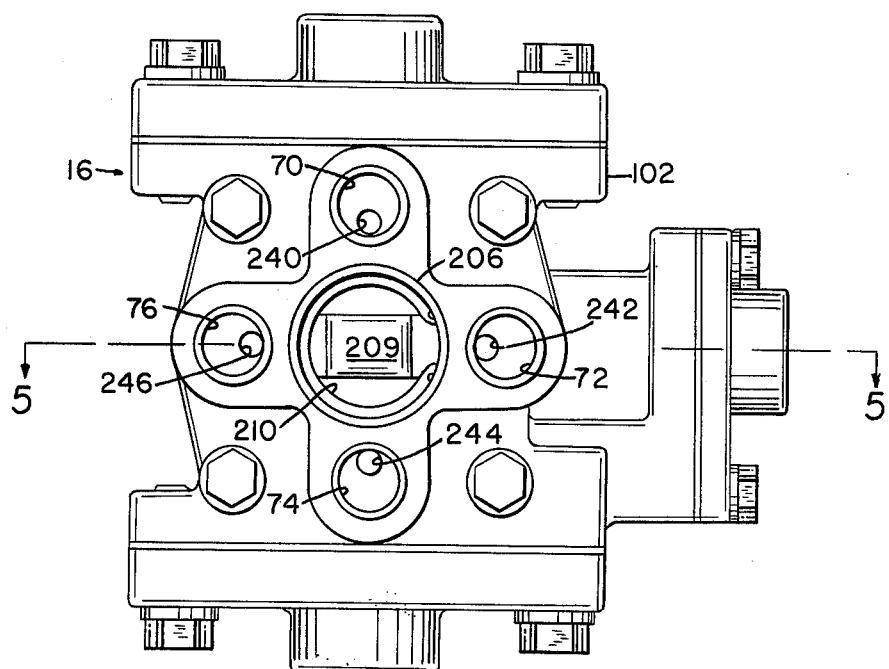
FIG. 4 illustrates a bottom view of the valve of this invention.

FIG. 4 illustrates a bottom view of valve 16 including brake chamber ports 70, 72, 74, 76 and exhaust port 206.

Figure 5:
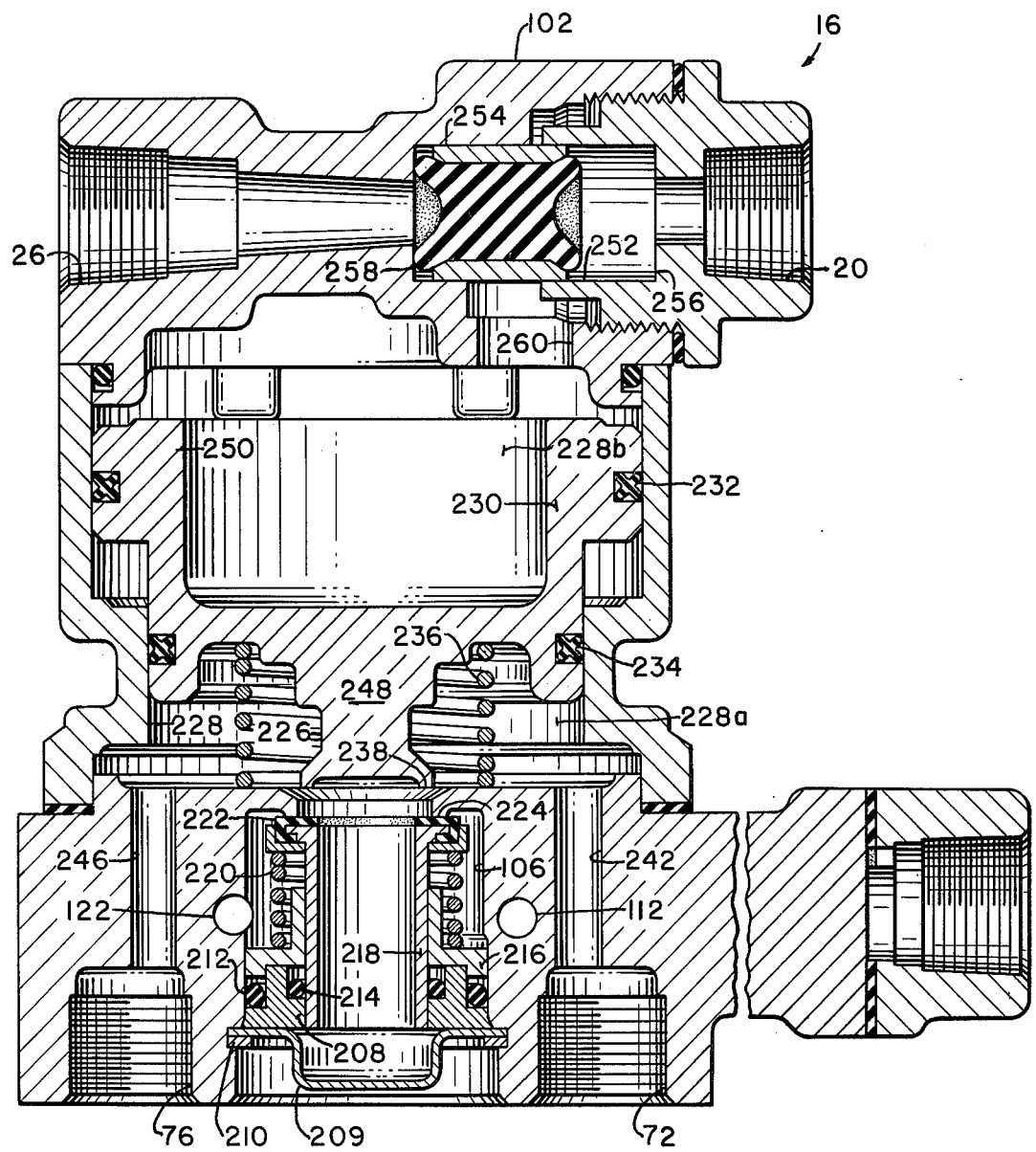
FIG. 5 illustrates a cross-sectional side elevation of this valve taken along line 5—5 of FIG. 4.

In FIG. 5, chamber 106 is illustrated in greater detail and includes annular member 208 retained therein by exhaust shield 209 and snap-type retainer ring 210. Annular member 208 includes outer annular resilient seal member 212 and inner annular resilient seal member 214. Annular guide member 216 abuts member 208. Valve member 218 is resiliently mounted in chamber 106 due to resilient member such as spring 220 seated against guide 216 and urging valve resilient sealing portion 222 into sealing engagement with seat 224. Valve member 218 is guided to reciprocate in engagement with guide member 216 and in sealing engagement with seal 214. Passage 122 is shown intersecting chamber 106. Adjacent seat 224 is reduced diameter passage 226 between chamber 106 and chamber 228. Chamber 228 includes piston 230 sealingly and resiliently mounted therein due to seals 232, 234 and spring 236 urging piston 230 away from chamber 106 to move seat 238 on extended portion 248 of piston 230 out of sealing engagement with resilient seal 222. Lower portion 228a of chamber 228 also includes port passages 240, 242, 244, 246 which interconnect that chamber with their respective brake chamber ports 70, 72, 74, 76. Seals 232, 234 sealingly separate lower portion 248 and upper portion 250 of piston 230 in chamber 228. Ports 20, 26 enter housing 102 and intersect at enlarged common chamber 252 which accommodates reciprocable sealing member 254 preferably of resilient sealing material and movable in chamber 252 to sealingly seat against either seat 256 at one end adjacent port 20 or against seat 258 at the other end, opposite the one end, adjacent port 26. Upper portion 228b of chamber 228 communicates with common chamber 252 via interconnecting passage 260.

In operation, with the valve 16 assembled as hereinabove described and connected for use in a vehicle braking system as illustrated in FIG. 1, it can be seen that air can be supplied from an air source such as a tractor (not shown) of a well-known tractor-trailer combination to the trailer portion through emergency gladhand connector 12 to ports 18 and 20 of valve 16. At a preselected pressure the air entering through port 18 into passage portion 108 overcomes the seating force of spring 133 and moves valve 110 out of sealing engagement with seal 148. This allows air to flow through passage 146 into branch passage 112 past check valves 114, 116 and into branch passages 118, 120. From passages 118, 120 air is supplied to reservoirs 40, 42 via respective reservoir ports 44, 46 and is also supplied to cavity 106 via passage 122 past check valves 124, 126. The air entering port 18 also flows through passage 128 past check valve 130 to cavity 106 thus bypassing main passage 104 thus serving as an additional supply of air to cavity 106 for use when air pressure may not be available from either of the reservoirs 40, 42.

Simultaneously, air enters port 20 and flows into chamber 252 urging sealing member 254 into sealing engagement against seat 258. The air then communicates with upper portion 228b of chamber 228 and the upper portion 250 of piston 230, forcing the piston downward. As a result, seat 238 is urged into sealing contact with seal 222 sealing exhaust port 206 and moves valve member 218 downward disengaging seat 224 from seal 222 communicating air pressure between chambers 106 and 228. Air then communicates through passages 240, 242, 244, 246 to their respective ports 70, 72, 74, 76 through respective conduits 78, 80, 82, 84 to their respective parking brake chambers 54, 56, 58, 60 for releasing the vehicle parking brakes.

During normal operation, the vehicle operator stops the vehicle by applying air pressure to the service gladhand connector 14. This pressure controls well-known antiskid valves 32, 36 which take air pressure stored in their respective reservoirs 40, 42 and apply it to service brake chambers 86, 88 and 94, 96 via conduits 90, 92 and 98, 100, respectively. This reduces pressure in the reservoirs and at reservoir ports 44, 46 of valve 16. Check valves 124, 126 maintain this reduced pressure at ports 44, 46 from correspondingly reducing the pressure applied to parking brakes 54, 56, 58, 60. The application of brake pressure by the vehicle operator to gladhand 14 also applies air pressure to port 26 of valve 16. Under normal conditions this pressure would stop at seat 258 of chamber 252 and be sealed against further communication by sealing member 254 acted upon by an equal or greater pressure applied to the opposite end of the sealing member through port 20 as described above. However, should the pressure at port 20 be less than the pressure applied at port 26, sealing member 254 would move to the right, as shown in FIG. 5, thus causing the member to sealingly engage seat 256 thus communicating the air pressure at port 26 with the upper portion 250 of piston 230. As a result, the parking brakes will be maintained in the released condition as described above.

To apply the parking brakes, air pressure is exhausted from the upper portion 228b of chamber 228 thus relieving pressure acting on the top 250 of piston 230. This pressure is released via common chamber 252 through either port 20 or 26. This permits spring 236 and pressure in lower portion 228a of chamber 228 to urge piston 230 upward into upper portion 228b of chamber 228. As a result, such upward movement of piston 230 causes seat 224 to engage seal 222 thus sealing communication between chambers 106 and 228. Continued upward movement of piston 230 ultimately disengages seat 238 from seal 222 opening exhaust port 206 and permitting air pressure to communicate from parking chambers 54, 56, 58, 60 through their respective conduits 78, 80, 82, 84, ports 70, 72, 74, 76, passages 240, 242, 244, 246 and through lower chamber portion 228a to atmosphere via exhaust port 206. Simultaneously pressure is exhausted from passages 112 and 108 through port 18. However, check valves 114, 116 and 130 prevent the loss of pressure in branch passages 118, 120 and 128, ports 44, 46 and their respective reservoirs 40, 42.

The foregoing has described, structurally and functionally, a valve for use in applying brake releasing pressure to brake chambers in a vehicle air brake system having reservoirs each containing air for either service or emergency use.

Modifications and variations of the present invention are possible in the light of the above teachings. It is therefore to be understood that within the scope of the appended claims the invention may be practiced otherwise than as specifically described.

I claim:

1. In a valve of the type which controls the supply of air to at least two air pressure storage means and the application of air pressure from said storage means to at least one air pressure operated brake in a vehicle air brake system, the improvement which comprises:
   a. inlet air pressure passage means for connecting air pressure with said storage means said inlet air pressure passage means having a first branch passage for connecting air pressure with one of said storage means and a second branch passage for connecting air pressure with the second other one of said storage means;
   b. first unidirectional valve means for preventing the flow of air pressure from either one of said storage means into the other through said inlet air pressure passage means and for preventing the loss of air pressure from said storage means through said inlet air pressure passage means;
   c. outlet air pressure passage means for connecting air pressure with said brake said outlet air pressure passage means having a first branch passage for connecting air pressure from one of said storage means with said outlet air pressure passage means and a second branch passage for connecting air pressure from the second one of said storage means with said outlet air pressure passage means; and
   d. second unidirectional valve means for preventing the flow of air pressure from either one of said storage means into the other through said outlet air pressure passage means and for selectively supplying air pressure to said outlet air pressure passage means from that one storage means which has the higher air pressure and for preventing the selected air from returning to its respective storage means.

2. The valve structure specified in claim 1 wherein the first unidirectional valve means comprise a first check valve means positioned in the first branch passage of said inlet air pressure passage means and a second check valve means positioned in the second branch passage of said inlet air pressure passage means.

3. The valve structure specified in claim 1 wherein the second unidirectional valve means comprise a first check valve means positioned in said first branch passage of said outlet air pressure passage means and a second check valve means positioned in said second branch passage of said outlet air pressure passage means.

4. The valve structure specified in claim 1 wherein the first branch passages of said inlet air pressure passage means and outlet air pressure passage means are interconnected and wherein the second branch passages of said inlet air pressure passage means and outlet air pressure passage means are interconnected and wherein the first unidirectional valve means comprise a first check valve means positioned in the first branch passage of said inlet air pressure passage means and a second check valve means positioned in the second branch passage of said inlet air pressure passage means and wherein said second unidirectional valve means comprise a first check valve means positioned in said first branch passage of said outlet air pressure passage means and a second check valve means positioned in said second branch passage of said outlet air pressure passage means.

5. A valve for controlling at least one air pressure operated vehicle brake in an air brake system wherein the system includes at least a first and a second air pressure storage means and an air pressure supply means, said valve comprising:
   a. first passage means for connecting air pressure from the supply means with said first and second storage means;
   b. second passage means for connecting air pressure from said first and second storage means with said air pressure operated brake;
   c. first valve means associated with said second passage means having a valve member in said second passage means for controlling application of air pressure from said storage means to said air pressure operated vehicle brake;
   d. second unidirectional valve means associated with said first passage means for preventing air pressure in said storage means from flowing into said air pressure supply means and for preventing air pressure in either one of said storage means from flowing into the other; and
   e. third unidirectional valve means associated with said second passage means for selectively supplying air pressure to the valve member of said first valve means from that one of the first and second air storage means which has the higher pressure and for preventing air pressure in either one of said storage means from flowing into the other and for preventing the selected air from returning to its respective storage means.

6. The valve structure specified in claim 5 which includes fourth valve means associated with said first passage means for blocking passage of air from said air pressure supply means at less than a predetermined pressure and for permitting the flow of air at pressure higher than said predetermined pressure.

7. The valve structure specified in claim 5 which includes third passage means for connecting air pressure from said air pressure supply means with the valve member of said first valve means said third passage means having a unidirectional valve means therein for preventing air pressure flowing from the valve member into said air pressure supply means.

8. The valve structure specified in claim 5 in which said first valve means includes air pressure actuated means for controlling said valve member in response to the pressure of said air pressure supply means.

9. The valve structure specified in claim 8 in which said air pressure actuated means comprises an air pressure actuated slidable piston for controlling said valve member and fourth passage means for connecting air pressure from the supply means with said slidable piston.

10. The valve structure specified in claim 9 in which said fourth passage means includes a first port therein for connecting air pressure from said fourth passage means to said fifth air pressure actuated means and a second separate port therein for connecting a separate supply of air pressure from said supply means to said air pressure actuated means.

11. The valve structure specified in claim 10 further comprising fifth valve means in said fourth passage means, said fifth valve means being operative for selectively supplying air pressure to said slidable piston from that one of the first port and the second separate port which has the higher air pressure.

12. The valve structure specified in claim 5 in which the first and second passage means are interconnected between said second and third valve means.

13. A valve for controlling at least one air pressure operated vehicle brake in an air brake system wherein the system includes at least a first and a second air pressure storage means and an air pressure supply means said valve comprising:
   a. first passage means for connecting air pressure from said supply means with said first and second storage means;
   b. second passage means for connecting air pressure from said first and second storage means with said air pressure operated brake;
   c. first valve means associated with said second passage means having a valve member in said second passage means positioned between said storage means and air pressure operated brake for controlling application of air pressure from said storage means to said air pressure operated vehicle brake;
   d. second unidirectional valve means in said first passage means positioned between said storage means and said air pressure supply means for preventing air pressure in said storage means from flowing out of the valve and into said air pressure supply means and for preventing air pressure in either one of said storage means from flowing into the other;
   e. third unidirectional valve means in said second passage means between said first valve means and said air storage means for selectively supplying air pressure to said first valve means from that one of said first and second air storage means which has the higher pressure and for preventing air pressure in either one of said storage means from flowing into the other and for preventing the selected air from returning to its respective storage means; and
   f. fourth valve means in said first passage means positioned between said air supply means and said second unidirectional valve means for blocking passage of air from said air pressure supply means at less than a predetermined pressure and for permitting the flow of air at pressure higher than said predetermined pressure.

* * * * *